June 24, 1969  J. P. LESPAGNOL ET AL  3,451,183
METAL FRAME FOR PARTITIONS AND SIMILAR CONSTRUCTIONS
Filed Nov. 19, 1965
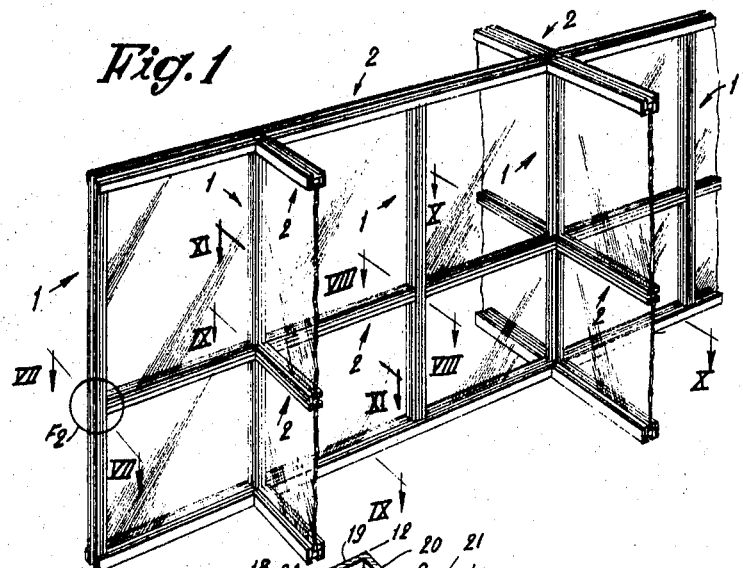
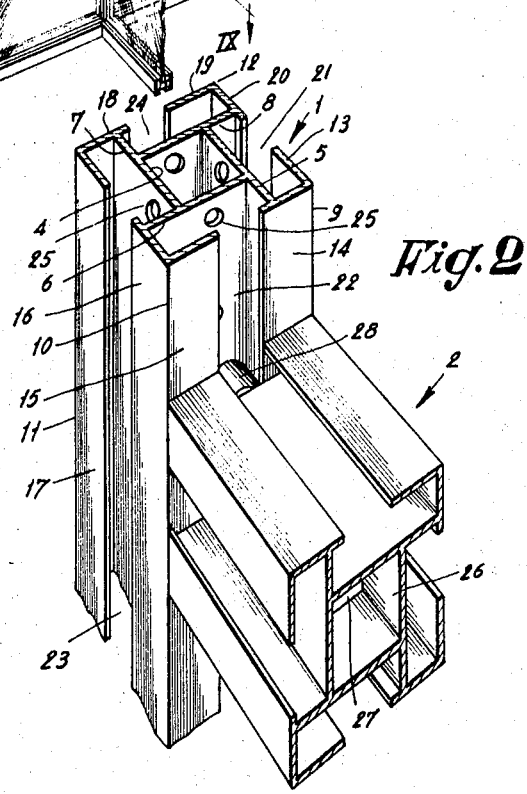
INVENTORS:
J. P. Lespagnol and G. Leurent
BY
Richards & Geier
ATTORNEYS

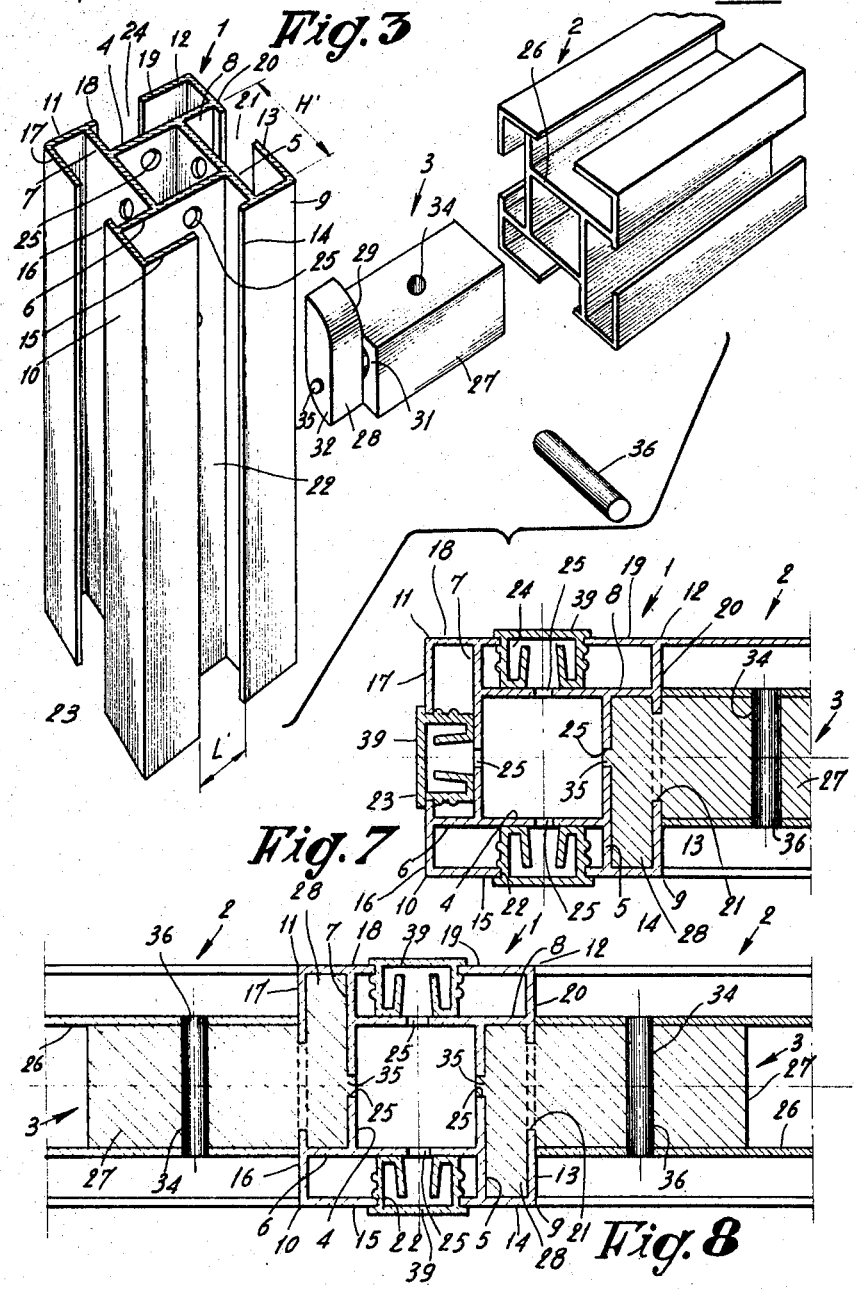

INVENTORS:
J. P. Lespagnol and G. Leurent
BY
Richards & Geier
ATTORNEYS

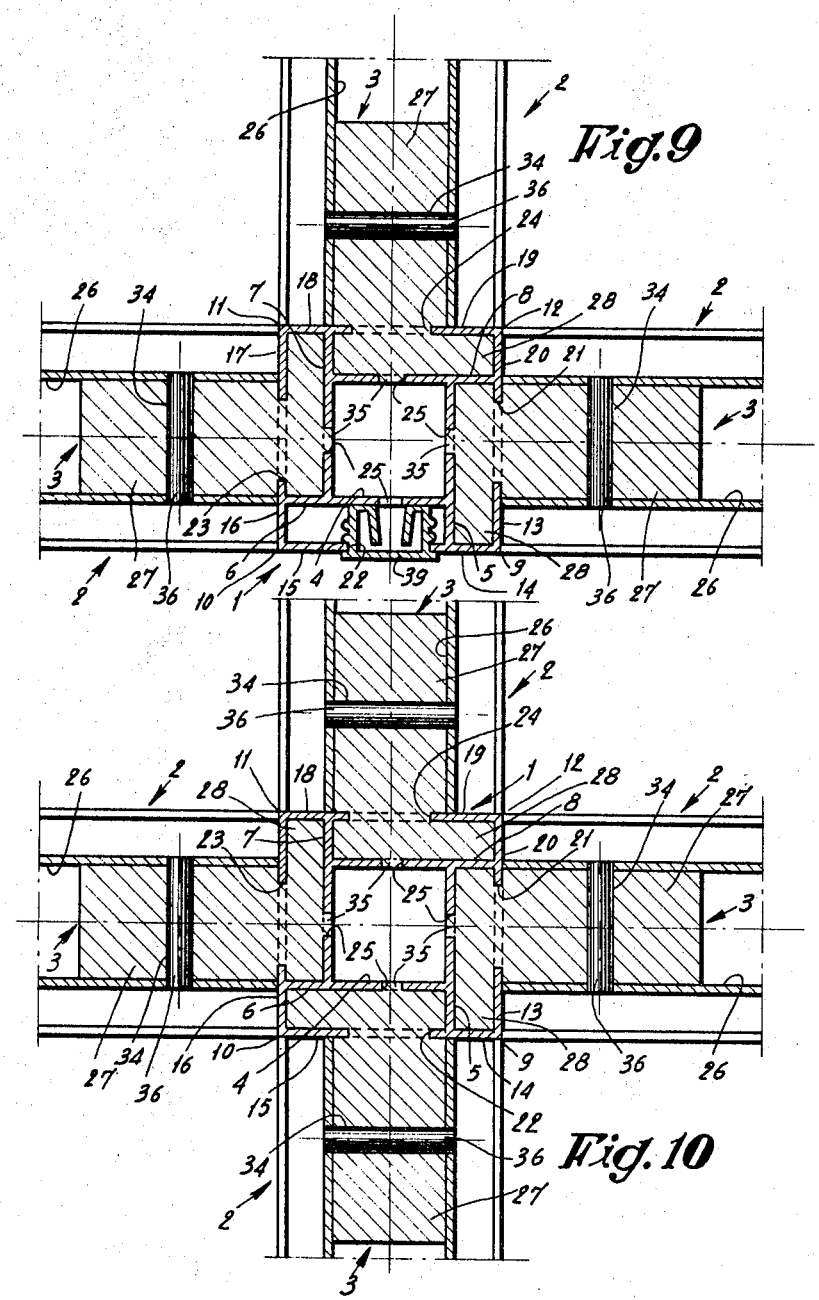

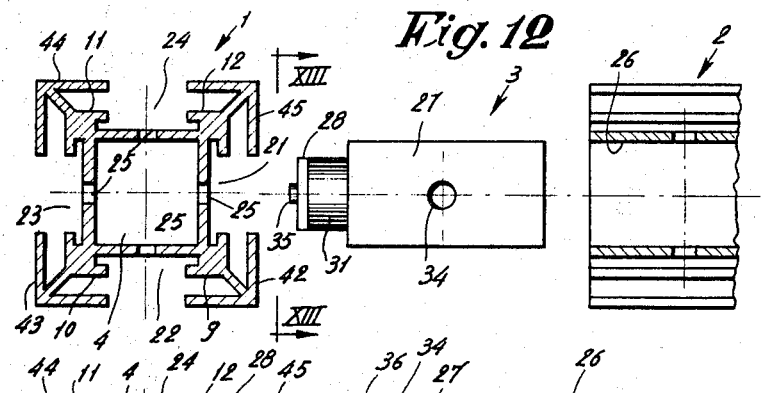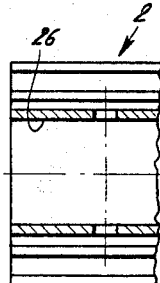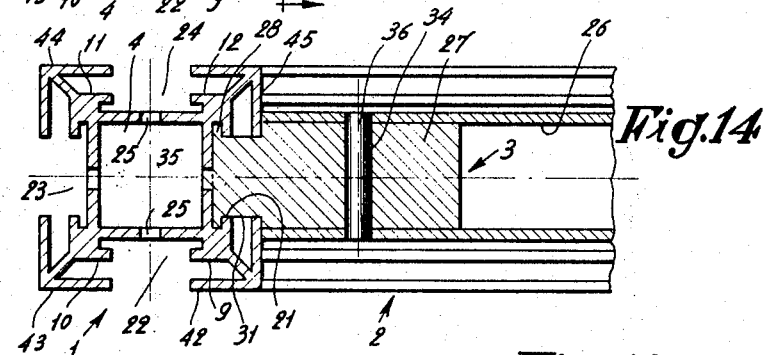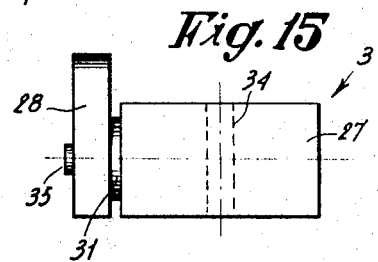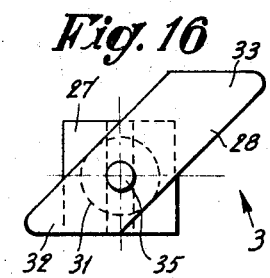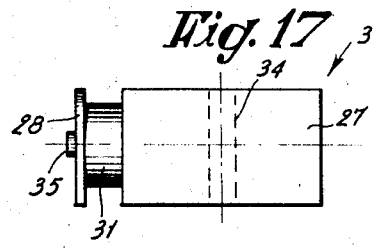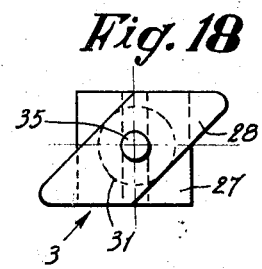

United States Patent Office 3,451,183
Patented June 24, 1969

3,451,183
METAL FRAME FOR PARTITIONS AND SIMILAR CONSTRUCTIONS
Jean P. Lespagnol, Bouches-du-Rhone, France, and Ghislain Leurent, Mouscron, Belgium, assignors to Societe Industrielle de Transformation des Plastiques Societe à responsabilite, limitee, Tourcoing, Nord, France, a company
Filed Nov. 19, 1965, Ser. No. 508,737
Claims priority, application France, Nov. 25, 1964, 20,780; Mar. 16, 1965, 9,421
Int. Cl. E04b 2/62, 2/72; F16b 1/00
U.S. Cl. 52—656         10 Claims

ABSTRACT OF THE DISCLOSURE

A metal frame for partitions has tubular uprights with hooking profiles. Cross beams are connected to the uprights by the turning of connecting members having a body, a head and a groove between the body and the head. Then the connecting members and the cross beams are locked by pins or the like.

---

The present invention relates to a metal frame for partitions and similar constructions. An object of the present invention is to provide metal frames for partitions of improved construction.

Other objects of the present invention will become apparent in the course of the following specification.

In the accomplishment of the objectives of the present invention it was found desirable to provide a combination of tubular uprights, the lateral faces of which presenting a hooking profile; cross-beams at suitable heights and adjacent to said uprights and, between the latter and said cross-beams, connecting elements substantially constituted by a body and a head separated by a groove, the hooking of said connecting elements to said uprights being effected by a rotary motion of said elements around their longitudinal axis, while the locking of said connecting elements and said cross-beams is produced by means of pins or similar means.

One form of embodiment is described in detail hereafter without implying any particular limitation, with reference to the appended drawings of which:

FIGURE 1 illustrates diagrammatically a perspective view of part of a metal construction conforming to the present invention;

FIGURE 2 shows, on an enlarged scale, and in a perspective view, an assembly at the point designated by the circle F2 in FIGURE 1;

FIGURE 3 shows as an exploded perspective view, an assembly system according to the present invention;

FIGURES 7, 8, 9, 10 and 11 are cross-sections along the lines VII—VII, VIII—VIII, IX—IX, X—X and XI—XI of FIGURE 1;

FIGURE 12 illustrates a diagrammatic exploded view of a different embodiment of the assembly system conforming to the present invention;

FIGURE 14 shows in a longitudinal section, the device of FIGURE 12, in assembled condition;

FIGURES 15 and 16 illustrate respectively front and side views of another form of embodiment of the characteristic connection element according to the present invention; and FIGURES 17 and 18 illustrate respectively front and side views of still another form of embodiment of this connecting element.

Figure 11:
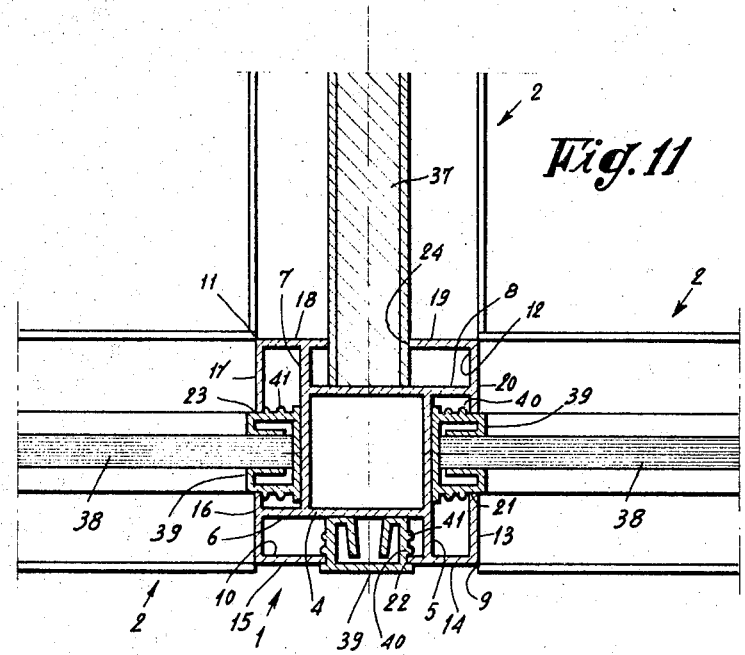
Figure 4:
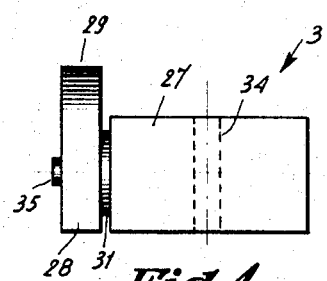
FIGURES 4, 5 and 6 illustrate respectively front, top and side views of the connection element characteristic of the present invention.
Figure 6:
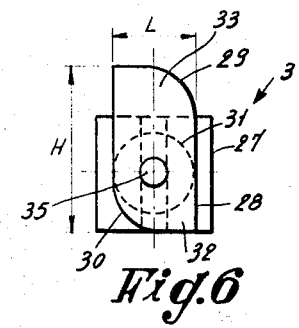
Figure 5:
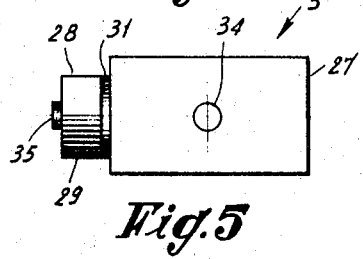
Figure 13:
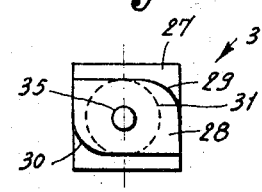
FIGURE 13 is a section along the line XIII—XIII of FIGURE 12.

According to the present invention, the assembly system mainly consists of an upright or post 1, at least one cross-beam 2 and a connecting element 3. This system of assembly can be applied, under the same conditions, for fastening to an upright 1, one, two, three or four cross-beams 2. In all cases, exactly the same uprights, cross-beams and connection parts can be used.

In the example of FIGURES 1 to 10, which show all the parts of one and the same construction, such as illustrated diagrammatically in FIGURE 1, use has been made by way of uprights, of a tubular element 4 which, in this instance has a square cross-section and of which all four faces have, on one side, an extension, 5–6–7–8 respectively, of which the free edges have right-angle bends 9–10–11–12 respectively, of which each one delimits two hooking surfaces 13–14, 15–16, 17–18, 19–20 respectively. The two hooking surfaces disposed in front of each one of the side faces of the tubular element 4 are unequally long, whereas the free space, 21–22–23–24 respectively, which separates them is disposed symmetrically with respect to the longitudinal axis of the corresponding outer faces of upright or post 1. The side faces of the tubular element 4 may with advantage be provided on their four faces with holes 25 for locating the cross-beams.

These holes may be provided only at the exact places corresponding to the level of the cross-beams to be fastened, or standardized elements may be made having on each face of the tubular element 4, a series of such openings. For this purpose, it will be enough, for the further finishing of the constructions, to establish a given module which will duly take into account the usual requirements or desiderata.

The recourse to such a module is, on the other hand, quite useful for the subsequent location of the simple or double, opaque or translucent panels to be used in such metal framework.

The cross-beams 2 may either be identical to said uprights or posts 1 or have any other shape, provided that they comprise a tubular part 26 which is either open or closed.

In the embodiment illustrated in FIGURES 1 to 10, the cross-beams 2 are identical to the uprights 1.

In this particular instance, the connecting element 3 consists of a prismatic body 27 of which the cross-dimensions are slightly smaller than those of the tubular part 26 of the cross-beams, so that said body 27 might engage therein with an easy fit; a head 28 which is also of prismatic shape has, diagrammatically opposed, two cylindrical faces 29–30, whereby the head 28 is separated from said body 27 by the groove 31 and disposed excentrically with respect to the longitudinal axis of said body 27. In the present instance, this excentric arrangement is such that one of the ends 32 of said head 28 is placed in the plane of the corresponding side face of body 27 whereas its second end 33 projects considerably beyond the plane of the opposite face of aforesaid body 27.

Said head 28 has a width L slightly smaller than the spacing L' of the aforementioned spacings 21–24 of the posts and a height H less than the width H' of the spaces delimited by the hooking ribs of said uprights.

The body 27 of the hooking element 3 may have at least one opening 34 of which the axis is parallel to the longitudinal axis of the head 28 considered in the sense of its height H. Finally, said head 28 may, on its extreme face and in the longitudinal axis of body 27, comprise a small stud 35 of which the diameter is just a little smaller than that of said positioning openings 25.

For assembling an upright 1 and a cross-beam 2, it suffices to fasten a connecting element 3 to the upright by introducing the head 28 into the corresponding spacing 21–24, whereby the stud 35 engages the appropriate positioning hole 25, after which this connecting element 3 is rotated about its longitudinal axis, which causes it to hook systematically and at the correct height to the upright or post 1. It then suffices to place the cross-beam 2 into the correct position by causing its tubular part 26 to glide over said body 27 and hence to bring the end of the cross-beam 2 into contact with the corresponding outer part of upright 1. The assembly is finished by fastening cross-beam 2 and the connecting element 3 by means of a pin 36 for instance, engaged in the coaxial hole of this element.

This operation can be repeated for anyone or each of the outer faces of the posts or uprights 1 depending on the number of the assemblies to be carried out, i.e. the number of adjacent walls to be connected.

In FIGURES 1 to 10, the same reference numbers refer to the same elements.

By means of such an assembly of uprights and cross-beams, it is easy to fit together rapidly and systematically, and practically without any tools, a metal framework which can be used as support for all usual filler elements of small metal work such as all kinds of panels, either opening or fixed, etc.

The fitting into place of these filler elements is facilitated by the presence of the spacings 21–24 on each one of the outer faces of the posts or uprights. As illustrated diagrammatically in FIGURE 11, it will be possible to fasten therein either opaque panels 37 or transparent panels 38. In the first instance, the panels may be made of any thickness, and either simple or multiple, the adjacent edges being preferably of a width which is very nearly equal to that of said spacings 21–24, so as to require no further fixing means.

It is of course quite evident that this fixing operation could be carried out indirectly and made by any complementary elements such as for instance those belonging to the kind suggested for fastening the transparent panels 38. This particular element is, in the present instance, formed by a shaped bead 39. Such bead has the advantage of being reversible, i.e. of being capable to be used either as glaziers bead by securing at the same time the fastening and the sealing between said panels 38 and the adjacent uprights and cross-beams, or as mere closing element for the spacings 21–24 which are not used.

This double function of beads 39 is illustrated in FIGURE 11. It should be noted that, for the purpose of fulfilling this double function, said beads have, on their side face, two ribs 40–41.

These ribs, by their relative positions, are such that one secures the hooking of the bead when the latter must fix panel, while the second one secures this hooking when the bead must merely act as a shutter.

Since the present invention mainly concerns the assembly as such, any kinds of uprights 1, of cross-beam 2 and of connecting elements 3 may be used for the purpose provided that the features disclosed by the present application for making this assembly are fulfilled. For this purpose, said uprights may have any box-like deformations whatsoever, as long as the boundary faces comprise hooking ribs accessible to the head of the connecting element 3.

FIGURES 12 and 14 illustrate a different embodiment of said uprights or posts 1 capable of being applied to the assembly system according to the present invention. In this form of embodiment, there are again the tubular element 4, the hooking right-angles 9–10–11–12 and the access spaces 21–22–23–24 respectively, as well as the position openings 25.

The outer reinforcement ribs 42–43–44–45 respectively, must be designed so that they do not interfere with the access spacings and that they delimit the outer faces of uprights or posts 1 with which the adjacent ends of the cross-beams 2 to be fastened will come into contact. The connecting element 3 is the same as that which was described above, it being understood however that the body 27 must be adapted to the box-shaped element 26 of the cross-beam 2; the head 28 must be adapted to its recess delimited by the box-shaped element 4 and to the fins of the outer right-angles 9–10 and, finally, the groove 31 must, especially as far as its width is concerned, be determined by the space separating the inner face of said hooking angles 9–12 and the outer face of the reinforcement ribs 42–45. Apart from that, the subsequent positioning, hooking and fastening means are similar to those which have been described above in connection with the preceding example.

In these two examples, the head 28 and the body 27 of the connecting element are such that their hooking to an upright involves a rotation by 90°. This arc can of course be made smaller by altering the shape and/or the relative position of said head 28 with respect to said body 27.

FIGURES 15 and 16 illustrate such a modification which applies to the example of FIGURES 1 to 10. It should be noticed that the head 28 has a cross-section shaped as a parallelogram. As a result of this particular shape, the angular rotation for securing the hooking, can be reduced by half.

FIGURES 17 and 18 illustrate the same adaptation of the connecting element 3, in FIGURES 12 and 14.

For the correct positioning of the connecting elements 3, any other means might be resorted to than the combination of openings 25 and studs 35. In fact, this positioning might quite well be secured by a clamping effect or by the engagement of projecting parts into recessed parts, or by any other appropriate means. Similarly, the fastening between connecting elements and cross-beams could also be produced by any other means than a pin, such as by clamping, dogs, engagement of projecting parts into recessed parts or by any other adequate separate element. As a complement to the assembly element as such, the present invention concerns any metal construction whatsoever applying this assembly system and also includes, in its capacity of new industrial product, any uprights or posts, any cross-beams and any connecting elements specially designed or intended for putting into practice this assembly device.

What we claim is:

1. Metal frame for partitions and similar constructions, comprising tubular uprights, the lateral faces of which present a hooking profile; cross-beams located at suitable heights and adjacent to said uprights and, between the latter and said cross-beams, connecting elements substantially constituted by a body and a head separated by a groove, the hooking of said connecting elements to said upright being effectuated by a rotary motion of said elements around their longitudinal axis, and means for locking said connecting elements and said cross-beams.

2. Metal frame according to claim 1, wherein the lateral faces of said tubular uprights have in addition to said hooking profile apertures located at the level to be occupied by said cross beams; said head having an axial finger adapted to be engaged in said apertures of the uprights.

3. Metal frame according to claim 1, wherein the connecting element comprises a body, a groove and a head, said body being designed with respect to shape and dimensions in accordance with the hollow part of the cross-beam in which it is to be engaged, the shape, dimensions and relative position of said head and said groove being determined by the hooking section of the uprights.

4. Metal frame according to claim 1 wherein the body of the connecting element and the cross-beams comprise openings for engaging therein fastening pins.

5. Metal frame according to claim 1 having reversible elastic beads comprising, on their side face, at least two ribs of which one acts as hooking element when said head is in closure position, the second rib serving as hooking element when the bead is used as glaziers bead, said heads being introduced into the spaces giving access to the hooking sections.

6. Metal frame for partitions and similar constructions, comprising hollow uprights, each of said uprights being of square cross section each face of which is extended on one side, and comprising a right-angled corner-piece, the extension of each face being fitted at its boundary edge with said corner-piece, whereby each one of the faces of said tubular element presents a hooking section accessible through a median space, cross-beams, connecting elements between said uprights and said cross-beams, each of said connecting elements comprising a body and a head, a groove being formed between said body and said head, whereby said connecting elements are hooked to said uprights by rotating said connecting elements about their longitudinal axes, and means locking said connecting elements and said cross-beams.

7. Metal frame for partitions and similar constructions, comprising hollow uprights with lateral faces having a hooking profile, spaced cross-beams having hollow parts, connecting elements between said up rights and said cross-beams, each of said connecting elements comprising a body and a head, a groove being formed between said body and said head, said body fitting into the hollow part of a cross-beam, said head having two diagonally opposed cylindrical faces and conforming in shape to that of said hooking profile, the size of said groove being substantially smaller than that of said body and said head, said connecting elements being hooked to said uprights by rotating said connecting elements about their longitudinal axes, and means locking said connecting elements and said cross-beams.

8. Metal frame according to claim 7 wherein the head of said connecting element is situated excentrically with respect to the longitudinal axis of the body.

9. Metal frame according to claim 7 wherein the head of said connecting element is situated concentrically with respect to the longitudinal axis of the body.

10. Metal frame according to claim 7 wherein, the head of said connecting element has a cross-section of parallelogram shape.

References Cited

UNITED STATES PATENTS

| 1,417,102 | 5/1922 | Nyman et al. | 52—464 |
| 1,849,811 | 3/1932 | Smiley | 52—238 X |
| 2,106,084 | 1/1938 | Coddington | 52—721 X |
| 2,911,242 | 11/1959 | Bickerstaff | 287—189.36 |
| 2,947,390 | 8/1960 | Stollenwerk | 52—656 |
| 2,968,374 | 1/1961 | Bohnsack | 52—241 |
| 3,265,416 | 8/1966 | Downes | 52—242 X |
| 3,282,006 | 11/1966 | Halsey et al. | 52—582 X |
| 3,327,438 | 6/1967 | Cooper | 52—238 X |

FOREIGN PATENTS

| 1,191,539 | 4/1965 | Germany. |

DAVID J. WILLIAMOWSKY, *Primary Examiner.*

P. C. KANNAN, *Assistant Examiner.*

U.S. Cl. X.R.

52—241, 282, 456; 287—189.36